(12) United States Patent
Siimes et al.

(10) Patent No.: US 6,813,819 B2
(45) Date of Patent: Nov. 9, 2004

(54) SINGLE LEAK POINT CYLINDER

(76) Inventors: Thomas S. Siimes, 524 Jarvis Street, Windsor, Ontario (CA), N8P 1C9; Timo Siimes, 1187 Jarvis Street, Windsor, Ontario (CA), N8P 1C8

( * ) Notice: Subject to any disclaimer, the term of this patent is extended or adjusted under 35 U.S.C. 154(b) by 0 days.

(21) Appl. No.: 10/458,525

(22) Filed: Jun. 10, 2003

(65) Prior Publication Data

US 2003/0226848 A1 Dec. 11, 2003

Related U.S. Application Data

(60) Provisional application No. 60/387,619, filed on Jun. 10, 2002.

(51) Int. Cl.[7] .............................................. B23P 11/02
(52) U.S. Cl. .......................... 29/447; 220/281; 403/273
(58) Field of Search .......................... 29/447; 220/581, 220/582, 583; 403/273; 285/381.1

(56) References Cited

U.S. PATENT DOCUMENTS

| | | | | |
|---|---|---|---|---|
| 750,565 A | * | 1/1904 | Austin | 29/447 |
| 1,306,641 A | * | 6/1919 | Steenstrup | 220/582 |
| 2,026,133 A | * | 12/1935 | Mapes | 220/581 |
| 2,054,118 A | * | 9/1936 | Harrington et al. | 29/447 |
| 3,126,214 A | * | 3/1964 | Wong et al. | 29/447 |
| 3,521,786 A | * | 7/1970 | Szerejko et al. | 220/583 |
| 4,498,339 A | * | 2/1985 | Diggins | 220/582 |
| 5,152,452 A | * | 10/1992 | Fendel | 220/581 |
| 2004/0035870 A1 | * | 2/2004 | Sakaguchi et al. | 220/581 |
| 2004/0104235 A1 | * | 6/2004 | Sakaguchi et al. | 220/581 |
| 2004/0104236 A1 | * | 6/2004 | Sakaguchi et al. | 220/592 |

* cited by examiner

Primary Examiner—David P. Bryant
(74) Attorney, Agent, or Firm—Carlson, Gaskey & Olds

(57) ABSTRACT

A cylinder includes a substantially uniform wall thickness and a single potential leak point. A single uniform sheet of material is formed into the cylinder and includes a closed end and an open end. The open end includes a plurality of threads formed adjacent the open end having an interference fit with an adapter. The adapter is heated to a temperature greater than the cylinder to expand the adapter to a size allowing installation onto the threads of the cylinder. The adapter and cylinder are cooled and the threads of the adapter contract to tightly fit onto the threads of the cylinder and prevent removal of the adapter. The only potential leak point is then through the valve or other device receiving the contents of the cylinder.

11 Claims, 3 Drawing Sheets

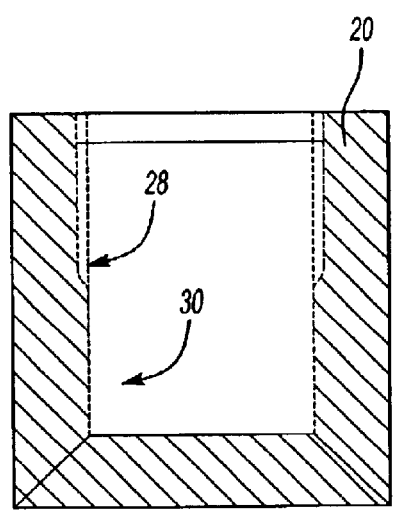
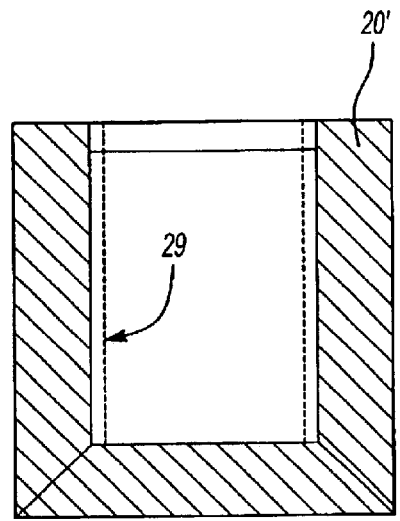
Fig-3A                Fig-3B
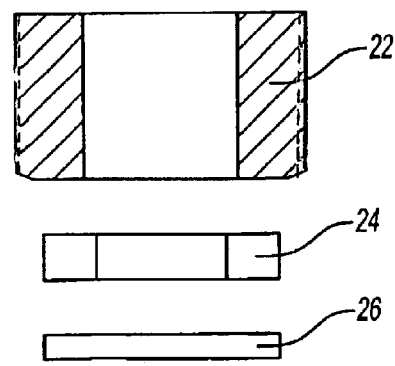
Fig-4

SINGLE LEAK POINT CYLINDER

This application claims priority to U.S. provisional application Ser. No. 60/387,619 filed on Jun. 10, 2002.

BACKGROUND OF THE INVENTION

This invention relates to a gas cylinder for holding a gas under pressure, and specifically to a gas cylinder and method of fabricating a gas cylinder having a single leak point.

Typically, gas cylinders are used to store a pressurized gas such as carbon dioxide for use with recreational paintball guns or to store a propellant gas for non-pressurized fire extinguishers. A slow leak in a gas cylinder containing propellant renders the fire extinguisher, paintball gun or other device in operable. It is therefore desirable to use a substantially leak proof gas cylinder.

A gas cylinder for the above applications ideally holds a pressurized gas for extend periods of time through a wide range of environmental conditions. Conventional, gas cylinders are fabricated from a tubular member with open ends. Each of the open ends are closed by attaching a cap or plug. Another method of closing the cylinder is a hot spinning process. The hot spinning process includes spinning the sides of the cylinder at one end into each other to form a seal. The sidewalls of the tubular member are driven towards each other under heat and pressure to close and seal off the cylinder end.

Typically, the hot spinning process results in the ends of the cylinder including a greater wall thickness than that of the sides of the cylinder. Gas cylinders fabricated by the hot spinning method typically include three leak points. The first and second of these leak points are disposed at the ends of the gas cylinder formed from the hot spinning process. Leaks form in the ends because the joint or seal is composed of the joining of two members, which forms a seam or leak path. To prevent leaks at the hot spun ends of the gas cylinder, the ends are fabricated with an increased thickness by folding layer upon layer of tubular member onto itself. In some cases a leak path forms within the seam at the end of the cylinder.

A third leak point is formed at the gas inlet fitting of the gas cylinder. Typically, threads are formed in the walls of the gas cylinder and a valve assembly is threaded onto the gas cylinder. Leaks can form around the valve assembly through the threaded interface.

Disadvantageously, current methods of forming gas cylinders contribute to the formation of the leak points other than through the valve assembly for controlling flow of gas from the cylinder. Accordingly, it is desirable to design a gas cylinder having only one potential leak path.

SUMMARY OF THE INVENTION

The present invention is a gas cylinder assembly and method of fabricating a gas cylinder having a substantially uniform wall thickness and a single potential leak point.

The gas cylinder is fabricating by a deep drawing process. The deep drawing process utilizes a single sheet of material having a uniform thickness to form a cylinder having a single open end and walls of a substantially consistent thickness. The use of one uniform sheet of material eliminates potential leak paths through the cylinder wall.

The end of the cylinder includes an adapter for an inlet. Leakage around adapter is prevented by assembling the adapter to the cylinder with interference fit threads that prevent leakage through the threads. The interference fit between the threads of the adapter and the cylinder prevent the adapter from being assembled with both the cylinder and adapter at a common temperature. The temperature of the adapter is elevated above that of the gas cylinder to expand the adapter to a size allowing assembly to the cylinder. The adapter is then cooled to the same temperature as the cylinder. The interference fit forms a leak proof seal that cannot be removed.

Accordingly, the gas cylinder of this invention provides a cylinder having only a single potential leak path through the inlet.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3A is a cross-sectional view of an adapter collar according to this invention;

FIG. 3B is a cross-sectional view of another adapter according to this invention;

FIG. 4 is an exploded view of a frangible disc assembled within the adapter collar.

DETAILED DESCRIPTION OF THE PREFERRED EMBODIMENT

Figure 1:
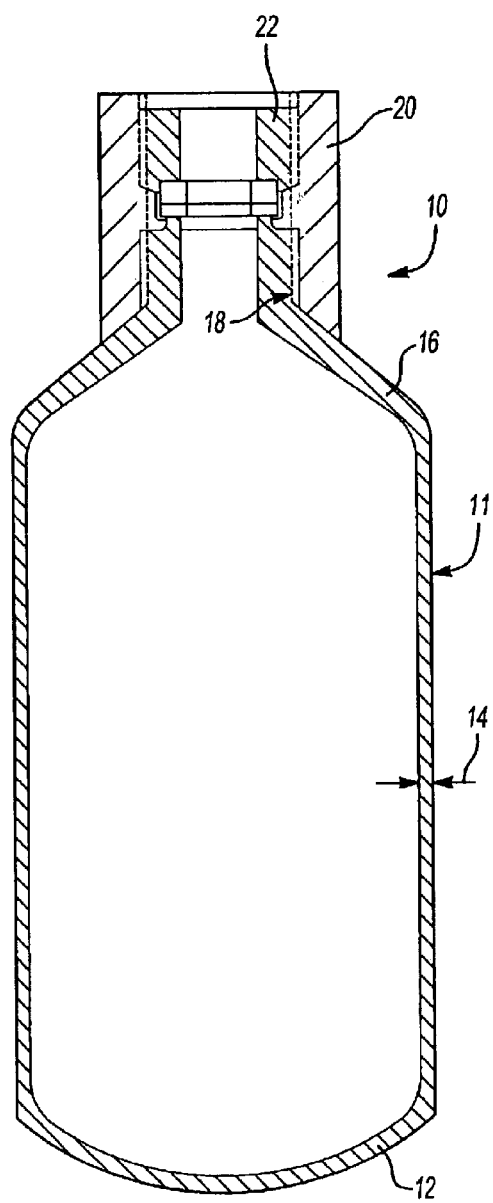
FIG. 1 is a cross-sectional view of a gas cylinder assembly according to this invention.

Referring to FIG. 1, the gas cylinder assembly 10 of this invention includes a cylinder 11 having a closed end 12 and an open end 16. The cylinder 11 includes a substantially uniform wall thickness 14 throughout. The open end 16 of the cylinder 11 includes mounting threads 18 that for mounting of an adapter 20. Any process known to a worker skilled in the art including cutting, or roll forming forms the threads 18 of the gas cylinder 10.

The adapter 20 provides for attachment of devices and valves that utilize the pressurized contents within the gas cylinder assembly 10. The adapter 20 includes threads 28 that correspond to the threads 18 of the gas cylinder 10, but only when the adapter 20 is at an elevated temperature relative to the cylinder 11. The adapter 20 also includes threads to engage an adapter nut 22 that secures a copper seal 24 and a frangible disc 26 within the adapter 20. The adapter 20 is installed to the cylinder 11 such that the adapter 20 is permanently attached to the gas cylinder 10 and forms a gas tight seal with the threads of the cylinder 11.

Permanent mounting of the adapter 20 is accomplished by providing the adaptor 20 with threads 28 that are an interference fit with the threads 18 of the cylinder 11. The adaptor 20 is heated to a temperature greater than the cylinder 11. The elevated temperature causes the adaptor 20, and the threads 28 to expand sufficiently to provide for installation onto the threads 18 of the cylinder 11 despite the interference fit. The adaptor 20 is then cooled, causing the adaptor 20 to contract around the threads 18 of the cylinder 11. The subsequent contraction of the adaptor 20 permanently mounts the adaptor 20 to the cylinder 11.

Subsequent heating of the adaptor 20 installed to the cylinder 11 does not allow removal. Because the adaptor 20 is installed onto the cylinder 11, heating the adaptor 20 would correspondingly heat the cylinder 11 to a common temperature. The cylinder 11 also expands proportionally with the adaptor 20 to maintain the interference fit therebetween. Therefore, the adapter 20 becomes a non-removable part of the cylinder 11.

The adapter 20 preferably includes standard threads 28; however, other threads as known to a worker skilled in the art are within the contemplation of this invention.

Referring to FIG. 3A, in one embodiment of this invention, the adaptor 20 includes a standard thread portion 28, and a tapered thread portion 30. The tapered portion 30 mates to the threads 18 of the cylinder 11 to form a seal and interference fit. The tapered thread portion 30 preferably forms the interference fit between the adaptor 20 and the threads 18 of the gas cylinder 10. Referring to FIG. 3B, another adapter 20' includes threads 29 of a standard non-tapered configuration sized to provide interference fit with the threads 18 of the cylinder 11.

Figure 2:
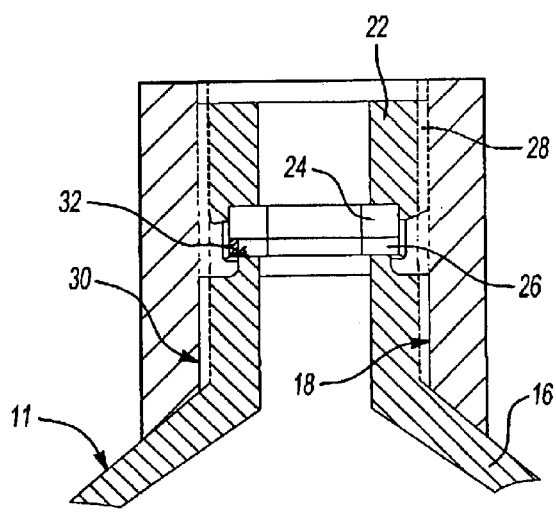
FIG. 2 is enlarged cross-sectional view of a top portion of the gas cylinder of FIG. 1.

Referring to FIGS. 2 and 4, the adapter 20 includes additional threads 28 for the installation of the disk nut 22. The disk nut 22 secures the copper seal 24 and the frangible disk 26 onto a sealing surface 32 of the cylinder 11. The frangible disk 26 is a safety device designed to rupture at a predetermined pressure within the cylinder 11.

Figure 5:
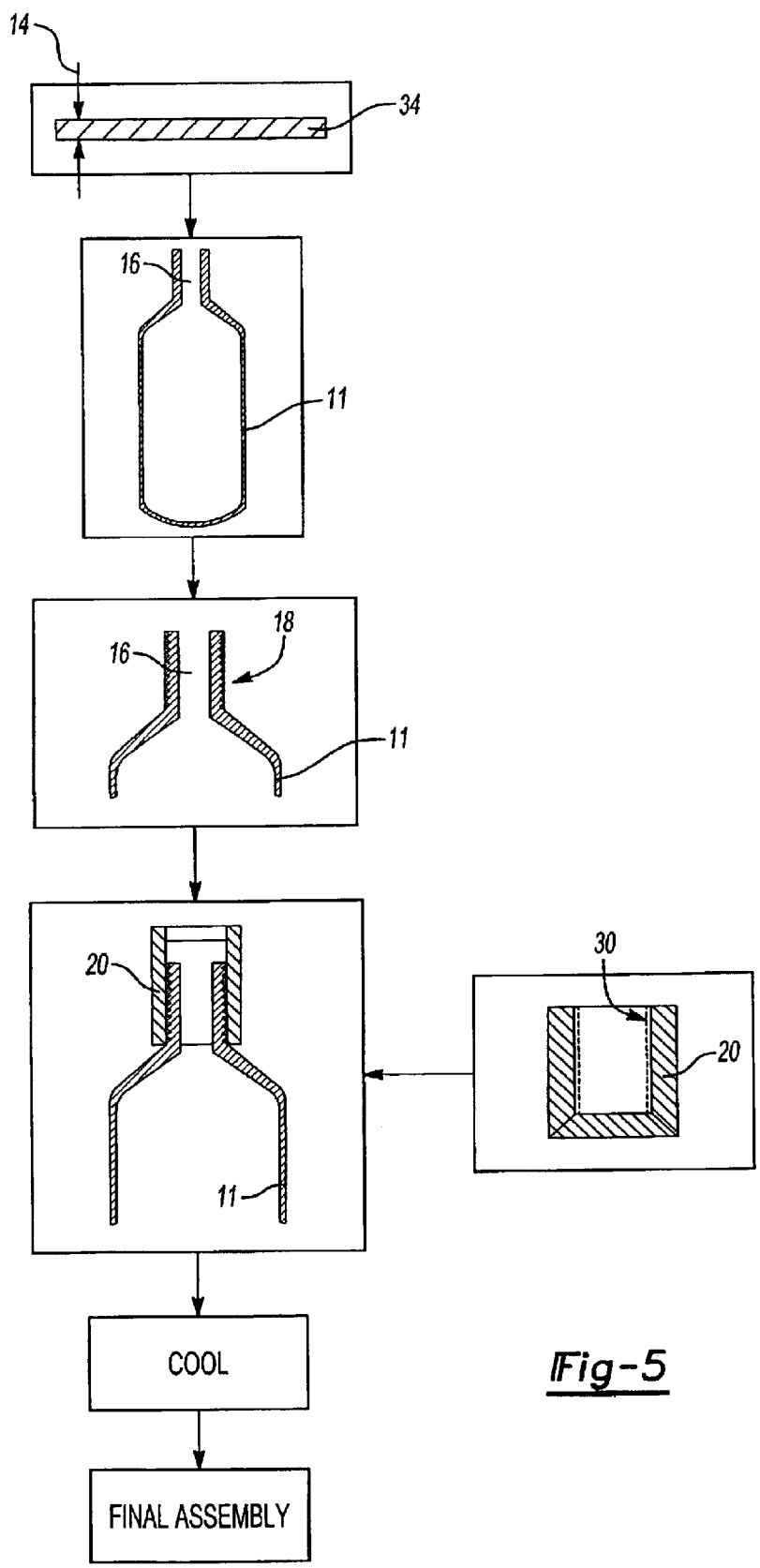
FIG. 5 is schematic representation of a process of fabricating a gas cylinder assembly according to this invention.

Referring to FIG. 5, a schematic representation of the process steps to fabricate the gas cylinder assembly 10 of this invention is shown. The cylinder 11 is preferably formed from a single sheet of material indicated at 34. The material 34 includes a substantially uniform wall thickness 14. The sheet of material is formed into the cylinder 11. Fabrication of the cylinder 11 from the single sheet of material 34 is accomplished through a deep drawing process. Deep drawing provides for the uniform wall thickness 14 of the cylinder 11. As appreciated, the uniform wall thickness 14 is sized dependent on application specific requirements such as pressure and environment. Because the cylinder 11 is formed from a common sheet of material 34, the only potential leak point is through the top segment 16 of the cylinder 11.

Threads 18 are then formed adjacent the top segment 16 of the cylinder 11. The threads 18 may be formed utilizing any method known to a worker skilled in the art. The adapter 20 is formed with the threads 30 that are an interference fit with the threads 18 of the cylinder 11, when both the cylinder 11 and adapter 20 are at a common temperature. The adapter 20 is heated to a temperature greater than that of the cylinder 11, and of such a temperature as to cause expansion of the adapter 20 and the threads 30 to allow threading engagement with the cylinder threads 18. The adapter 20 is assembled to the cylinder 11. Both the cylinder 11 and adapter 20 are then cooled to a common temperature. The adapter 20 contracts around the cylinder threads 18 such that the adapter 20 is not unthreadable. Further, subsequent heating of the adapter 20 will also heat the cylinder 11, causing uniform expansion that maintains the interference fit and prevents removal by unthreading of the adapter 20.

With the adapter 20 fixed permanent to the cylinder 11 final assembly is conducted that includes assembly of the frangible member 26, seal 24 and adapter nut 22. Further, it is within the contemplation of this invention that other types assemblies such as valves or devices using the contents of the cylinder 11.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention.

What is claimed is:

1. A method of fabricating a gas cylinder comprising the steps of:
   a.) forming threads adjacent an open segment of a cylinder;
   b.) heating an adapter having threads corresponding to the threads on the open of the cylinder to a temperature greater than the cylinder;
   c.) threading the heated adapter onto the threads of the cylinder; and
   d.) cooling the adapter to a temperature substantially the same as the cylinder.

2. The method of claim 1, comprising the step of forming the cylinder from a single sheet of material to have the open segment and a closed segment.

3. The method of claim 2, wherein said single sheet of material comprises a uniform thickness.

4. The method of claim 2, wherein said forming step comprises deep drawing the single sheet of material into the cylinder having the closed segment and the open segment.

5. The method of claim 1, comprising the step of forming threads within said adapter having an interference fit with the threads on the cylinder such that said adapter does not thread onto the cylinder when both the cylinder and the adapter are at substantially the same temperature.

6. The method of claim 5, wherein said step b, comprises applying heat to expand the adapter such that the interference fit threads of the adapter thread onto the threads of the cylinder.

7. The method of claim 1, wherein said step d, comprises cooling the adapter and the cylinder to a common temperature such that said adapter is not removable from the cylinder.

8. The method of claim 1, comprising the step of assembling a frangible disk into the adapter.

9. The method of claim 8, comprising the step of securing the frangible disk within the adapter with an adapter nut.

10. The method of claim 9, comprising the step of inserting a seal between the adapter nut and the frangible disk.

11. The method of claim 1, comprising the step of forming tapered threads within the adapter corresponding with the threads of the cylinder.

* * * * *